United States Patent
Hartman

Patent Number: 5,943,985
Date of Patent: Aug. 31, 1999

[54] WELDED BRACKET FOR SUPPORTING SUPERHEAT AND REHEAT ASSEMBLY TUBING ON STEAM COOLED HANGER TUBES

[76] Inventor: Ernest L. Hartman, 14 Sandpiper Dr., Bloomfield, Conn. 06002

[21] Appl. No.: 08/772,481

[22] Filed: Dec. 23, 1996

[51] Int. Cl.[6] .................................................... F22B 37/06
[52] U.S. Cl. .............................................. 122/511; 248/65
[58] Field of Search .................................. 122/510, 511; 248/65, 68.1, 218.4, 229.1

[56] References Cited

U.S. PATENT DOCUMENTS

| | | | |
|---|---|---|---|
| 2,714,496 | 8/1955 | Doyle | 248/65 |
| 3,880,123 | 4/1975 | Freiday | 122/510 |
| 4,550,777 | 11/1985 | Fournier et al. | 122/510 |
| 4,619,315 | 10/1986 | Waryasz | 122/510 |
| 4,848,452 | 7/1989 | McDonald et al. | 122/511 |
| 4,944,254 | 7/1990 | Fournier et al. | 122/511 |

*Primary Examiner*—Teresa Walberg
*Assistant Examiner*—Gregory A. Wilson
*Attorney, Agent, or Firm*—Robert S. Smith

[57] ABSTRACT

Apparatus which may be a part of various systems including piping systems and fluidized bed systems. The apparatus that holds one tube with respect to another tube includes a body that has a first cylindrical section shaped portion and a second cylindrical section shaped portion. Each of the cylindrical section shaped portions has an angular extent that is generally concave. The angular extent of the first cylindrical section shaped portion and the angular extent of the second cylindrical section shaped portion each have an axis and the axis of the first cylindrical section shaped portion may be spaced from the axis of the second cylindrical section shaped portion. Some embodiments of the invention have cylindrical section shaped portions that have an angular extent that is no greater than 180 degrees. The axis of the first cylindrical section shaped portion may be perpendicular to the second cylindrical section shaped portion. The cylindrical section shaped portions have extremities and a weld bead extends between each of the extremities of the first cylindrical section shaped portion and the first tubular member and a weld bead extending between each of the extremities of the second cylindrical section shaped portion and the second tubular member in some embodiments.

6 Claims, 4 Drawing Sheets

WELDED BRACKET FOR SUPPORTING SUPERHEAT AND REHEAT ASSEMBLY TUBING ON STEAM COOLED HANGER TUBES

TECHNICAL FIELD

The invention relates to apparatus for supporting tubes in which a very hot fluid is flowing on tubes that are cooler although still very hot. One application is to support superheat and reheat assembly tubing on steam cooled hanger tubes such as in fluidized bed steam generation apparatus. While the present invention has primary application to a fluidized bed combustion process in a steam generating system, including circulating fluidized bed steam generators and bubbling fluidized bed steam generators, those skilled in the art will recognize that the present invention has application to other power plant apparatus.

Fluidized bed combustion apparatus can burn coal efficiently at temperatures low enough to avoid many of the problems of combustion in other modes. The term "fluidized bed" refers to the condition in which solid materials are given free flowing, fluid-like behavior. As a gas is passed upward through a bed of solid particles, the flow of gas produces forces which tend to separate the particles from one another. At low gas flows, the particles remain in contact with other solids and tend to resist movement. This condition is referred to as a fixed bed. As the gas flow is increased, a point is reached at which the forces on the particles are just sufficient to cause separation. The bed is then deemed to be fluidized. The gas cushion between the solids allows the particles to move freely, giving the bed a liquid-like characteristic.

Fluidized bed combustion makes possible the burning of fuels having such a high concentration of ash, sulfur, and nitrogen that they would ordinarily be deemed unsuitable. By the use of this process it is possible, at least in some cases, to avoid the need for gas scrubbers while still meeting emissions requirements. In fluidized bed combustion, the fuel is burned in a bed of hot incombustible particles suspended by an upward flow of fluidizing gas. Typically the fuel is a solid such as coal, although liquid and gaseous fuels can be readily used. Characteristics of apparatus of this general type are further described in the publication *Combustion Fossil Power*, edited by Joseph G. Singer, P.E. and published by Combustion Engineering, Inc.; a subsidiary of Asea Brown Boveri, 1000 Prospect Hill Road, Windsor, Conn. 06095, 1991.

The fluidizing gas is generally combustion air and the gaseous products of combustion. Where sulphur capture is not required, the fuel ash may be supplemented by inert materials such as sand or alumina to maintain the bed. In applications where sulphur capture is required, limestone is used as the sorbent and forms a portion of the bed. Two main types of fluidized bed combustion systems are (1) bubbling fluid bed (BFB) in which the air in excess of that required to fluidize the bed passes through the bed in the form of bubbles. The bubbling fluid bed is further characterized by modest bed solids mixing rate and relatively low solids entrainment in the flue gas and (2) circulating fluid bed (CFB) which is characterized by higher velocities and finer bed particle sizes. In such systems the fluid bed surface becomes diffuse as solids entrainment increases, such that there is no longer a defined bed surface. Circulating fluid bed systems have a high rate of material circulating from the combustor to the particle recycle system and back to the combustor. The present invention has particular application to bubbling fluid bed boilers although those skilled in the art may recognize other applications.

A bubbling fluidized bed boiler utilizes steam or water cooled tubing surfaces to extract heat from the bed ash. The surface can the evaporative, superheater, or reheater tubing. The tubing surface conventionally includes a plurality of assembly tubes that are arrayed in a serpentine pattern in which the centerlines of the respective tubes are disposed within a common plane throughout substantially the entire axial extent of each of the tubes. A number of fluid cooled hangar tubes are typically disposed with axial sections thereof closely spaced from and at right angles to axial portions of the assembly tubes.

In the prior art constructions clamps that squeeze (clamp) individual tubes have been used. After the clamps have been attached to the individual tubes the clamps are welded together to position the tubes with respect to each other. Clamps that rely on squeezing the tubes are not satisfactory because of the substantial differences in tube dimensions over the wide operational temperature range. Temperatures of 1600 to 1700 degrees Fahrenheit are common in the operating fluidized bed. In one scenario that can occur with the clamp approach the clamps expand more rapidly than the tubing. Another scenario is that the alternate cooling and heating cycles loosen the clamps. Either scenario results in a very loose clamping action which will result in relative motion between the tubes and even tubes touching each other. This will result in wear of the tubes which will necessitate maintenance costs and may even result in tube failure.

OBJECTS AND SUMMARY OF THE INVENTION

It is an object of the present invention to provide apparatus which will firmly engage one assembly tube and one hangar tube without using clamping forces.

Another object of the invention is to provide apparatus that will prevent relative motion between either tube and the apparatus.

It is an object of the invention to provide apparatus that will require less maintenance than the prior art apparatus.

Yet another object of the present invention is to eliminate the necessity for shutting down the fluidized bed apparatus to replace tubing.

Still another object of the invention is to provide an attachment for the respective tubes that will have intimate thermal contact with the tubes and thus will have a temperature summary to the temperature of the tubes so that the attachment will be less likely to expand away from either tube.

It has now been found that these and other objects of the invention may be attained in apparatus which may be a part of various systems including piping systems including fluidized bed systems. The apparatus that holds one tube with respect to another tube includes a body that has a first cylindrical section shaped portion and a second cylindrical section shaped portion. Each of the cylindrical section shaped portions having an angular extent that is generally concave. The angular extent of the first cylindrical section shaped portion and the angular extent of the second cylindrical section shaped portion each have an axis and the axis of the first cylindrical section shaped portion may be spaced from the axis of the second cylindrical section shaped portion.

Some embodiments of the invention have cylindrical section shaped portions that have an angular extent that is no greater than 180 degrees. The axis of the first cylindrical section shaped portion may be perpendicular to the second cylindrical section shaped portion. In some embodiments each of the cylindrical section shaped portions has extremities and a weld bead extends between each of the extremities of the first cylindrical section shaped portion and the first tubular member and a weld bead extending between each of the extremities of the second cylindrical section shaped portion and the second tubular member.

BRIEF DESCRIPTION OF THE DRAWING

The invention will be better understood by reference to the accompanying drawing in which.

DESCRIPTION OF THE PREFERRED EMBODIMENT

Figure 1:
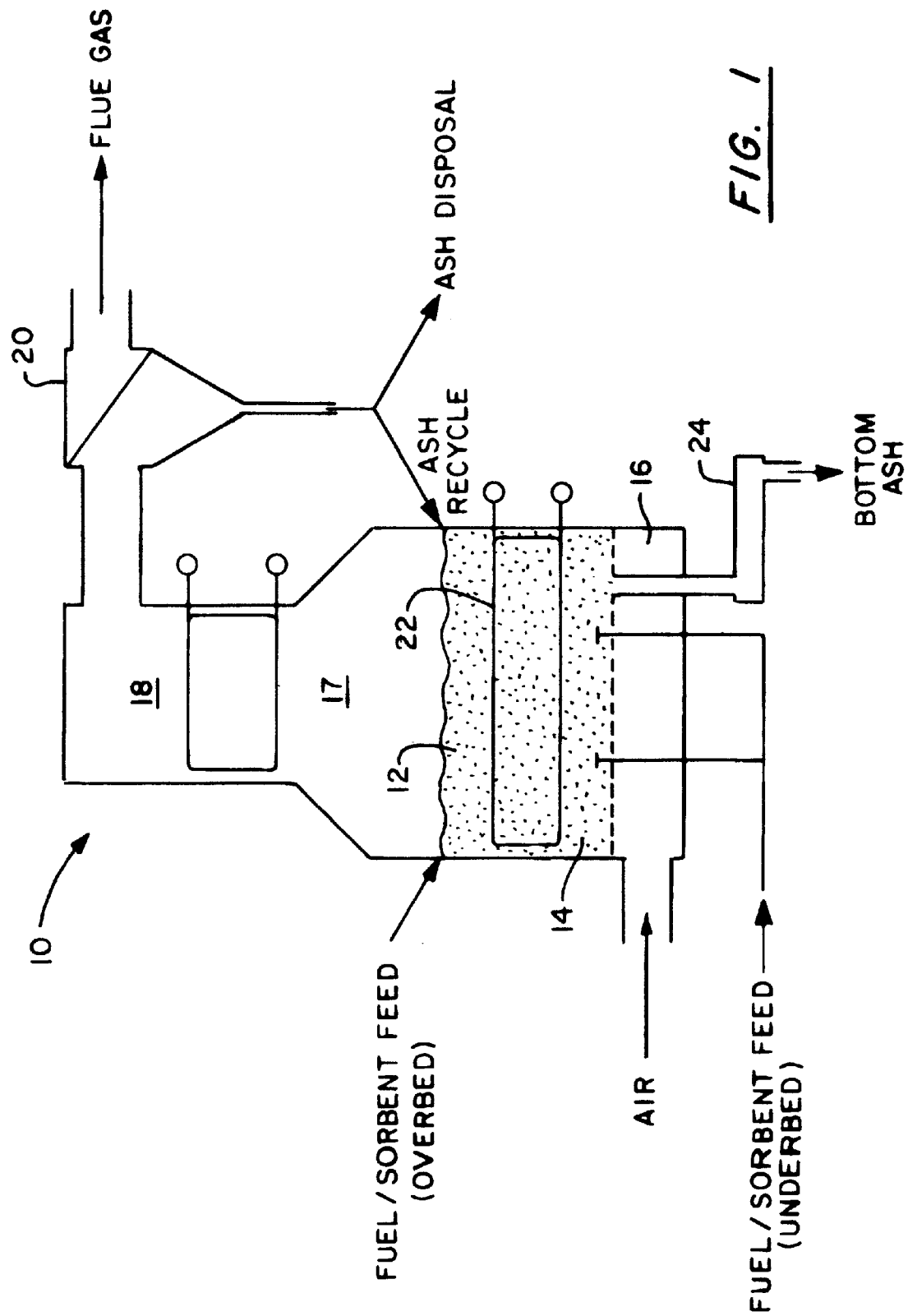
FIG. 1 is a partially schematic, elevational view of a typical bubbling fluidized-bed steam generator in which the present invention may be utilized.

Referring now to FIG. 1, there is shown a typical bubbling fluidized bed steam generator 10. Crushed fuel and sorbent 12 are fed to the top or bottom of a bed 14. Fluidized air is supplied to the bottom of the bed 14 through a plenum and air distributor 16. When a sulfur sorbent is used, sulfur capture takes place in the bed 14. Flue gas and some entrance solids passed into the section of the generator 10 above the surface of the bed 14. This section is called the freeboard 16. In the freeboard 16, additional combustion and sulfur capture can take place. From the freeboard 16, the gas and solids enter the convective pass 18 where they are cooled before entering a mechanical dust collector 20. The mechanical dust collector 20 collects the entrained solids for recycle to the bed 14 or for disposal. Flue gas from the mechanical dust collector passes to an air heater, fine particulate collector, and induced draft pan (not shown). The bed 14 temperature is maintained at the optimum for sulfur capture and combustion efficiency, usually by means of water cooled walls (not shown) in the generator 10 and/or a tube bundle 22 immersed in the bed 14. The bed 14 level is controlled by draining an appropriate amount of material from the operating bed 14. This material passes through an ash cooler 24.

Figure 2:
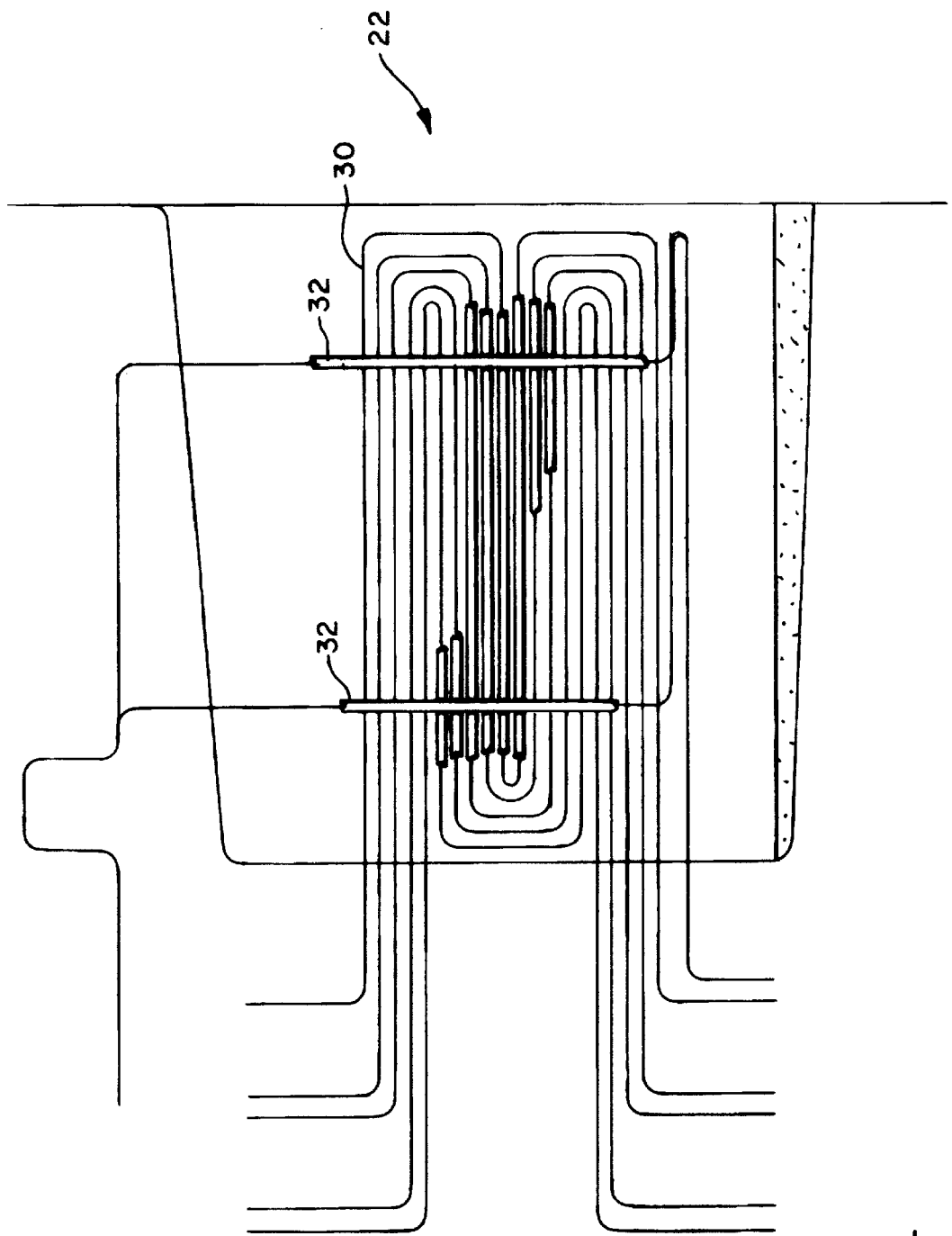
FIG. 2 is a plan view of the tubing disposed in the bed of the apparatus shown in FIG. 1.

Referring now to FIG. 2 there is shown in greater detail the tube bundle 22 in a typical bubbling fluidized bed boiler 10. The tubing surface conventionally includes a plurality of assembly tubes 30 that are arrayed in a serpentine pattern in which the centerlines of the respective tubes are disposed within a common plane throughout substantially the entire axial extent of each of the tubes. Each of the assembly tubes is connected to a common inlet header and a common outlet header. A number of fluid cooled hangar tubes 32 are typically disposed with axial sections thereof closely spaced from and at right angles to axial portions of the assembly tubes 30. In FIG. 2 substantial axial parts of the various tubes 30, 32 are represented by a single line. In the region in the drawing where axial parts of the tubes 30, 32 are shown with a less schematic double line representation there are a number of places where the tube 30 crosses the tube 32 at right angles. All of these intersections and a number of other intersections, where the respective tubes 30, 32 are disposed in perpendicular relationship, require a bracket such as the bracket in accordance with the present invention to maintain the relative positions of the tubes 30, 32.

Figure 4:
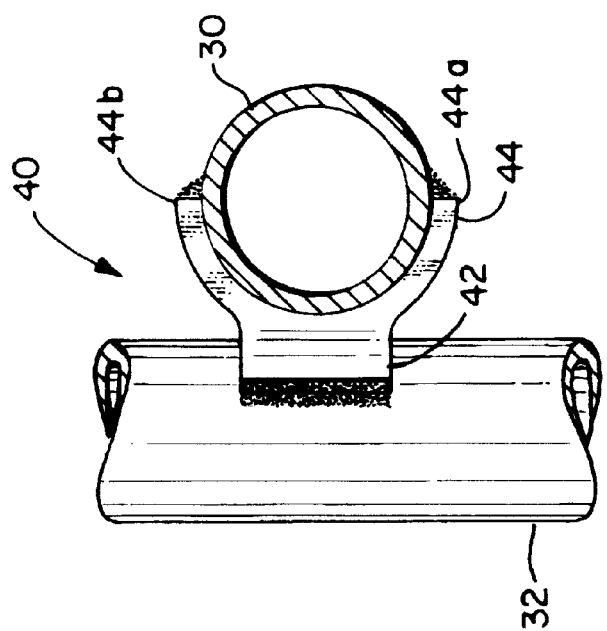
FIG. 4 is side elevational view of the structure shown in FIG. 3.
Figure 3:
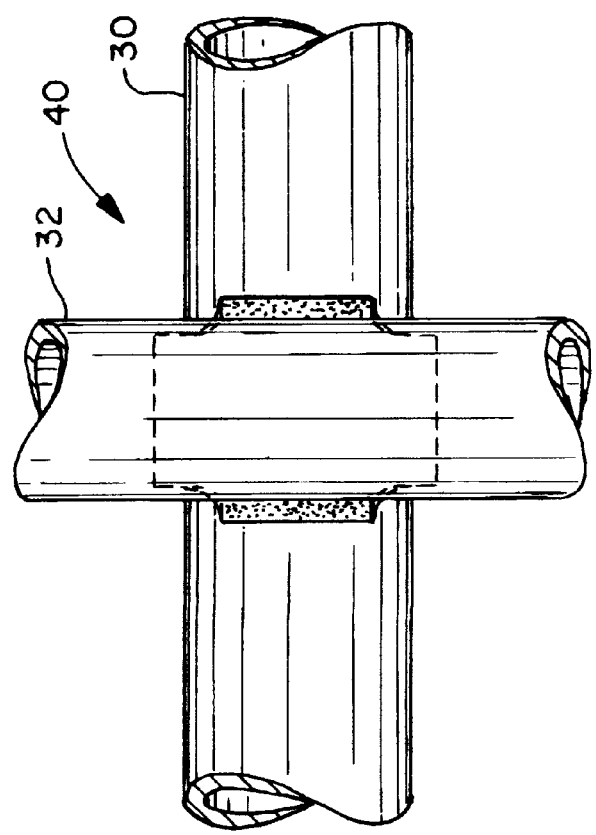
FIG. 3 is a plan view illustrating the bracket in accordance with one form of the present invention.
Figure 5:
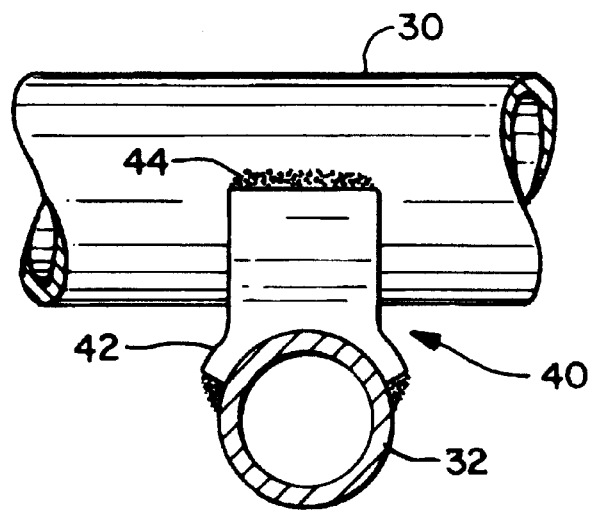
FIG. 5 is another elevational view to FIG. 4.
Figure 6:
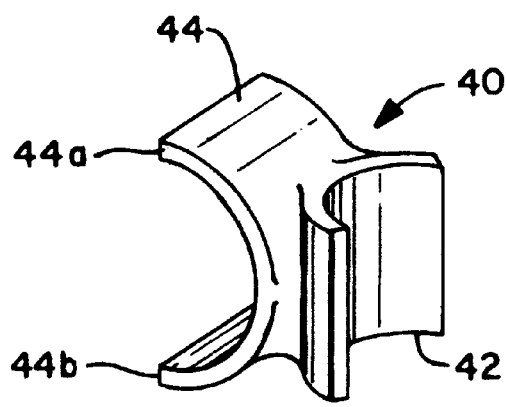
FIG. 6 is a perspective view of the bracket apart from any tubes.

Referring now to FIGS. 3–6 there is shown a bracket 40 in accordance with one form of the present invention. The bracket 40 is cast and has a first cylindrical section shaped portion 42 and a second cylindrical section shaped portion 44. The axis of the first cylindrical section shaped portion 42 is perpendicular to the axis of the second cylindrical section shaped portion 44. The angular extent of the cylindrical section shaped portions 42,44 will vary with the individual application. In the illustrated embodiment the second cylindrical section shaped portion 44 extends through an arc of 180 degrees. This is best seen in FIG. 4 which also clearly shows that the extremities 44a, 44b coincide with an imaginary plane that axially bisects the tube 30. This contour facilitates placement of a weld bead along the entire axial extent of the extremities 44a, 44b.

The angular extent of the cylindrical section shaped portion 42 is about 130 degrees. The exact angular extent is about 130 degrees. The angular extent is less than the angular extent of the cylindrical section shaped portion 44 in part because of the larger diameter of the tube 30. The extremities 44a, 44b are configured to be coincident with planes extending from the axis of curvature of the second cylindrical section shaped portion and extending radially. This contour is also used to allow placement of a weld bead along the extremities 44a, 44b. It is preferred that the weld bead extend along the entire axial extent of the extremities 42a, 42b, 44a, and 44b. This will ensure maximum strength and maximum thermal contact. The maximum thermal contact is essential to maintaining the bracket 40 at a temperature that is near the temperature of the tubes 30, 32.

To insure precision the term cylindrical section will be further defined. The term "cylinder" is refers to the surface traced by a straight line moving parallel to a fixed straight line and intersecting a fixed planar closed curve. The term "section" is commonly understood to be a part cut off or separated from something. It will be understood that if one had a cylindrical body, such as a typical "tin" can with the top and bottom cut off, and you cut portions off this body (without changing the shape of the piece that is cut off) then the piece that is cut off is a cylindrical section. For example, if one used a circular saw to cut off axial sections of the rigid cylinder (by cutting in planes that are perpendicular to the geometric axis of the cylindrical body) you would then have a plurality of cylindrical sections. More specifically, the outer and inner surfaces of each of such pieces will be cylindrical sections.

It will thus be seen that the present invention securely mounts the bracket 40 to the tubes 30, 32 in a manner that does not rely on clamping. The secure mounting insures that the tubes 30, 32 do not accidentally separate from the bracket 40 and that the bracket 40 maintains good thermal contact with the respective tubes 30, 32. This assures that there is proper separation of the tubes 30, 32 and that the neither tube moves relative to the bracket 40 or rubs against the other tube.

Although the brackets have been shown in a form in which the respective axes of the first and second cylindrical section shaped portions 42, 44 are disposed with the respective axes thereof in mutually perpendicular relationship, it will be understood that other forms of the invention will have other geometric relationships. Usually, the axis of the first cylindrical section shaped portion and the second cylindrical section shaped portion will be spaced apart so that they do not intersect.

The invention has been described with reference to its illustrated preferred embodiment. Persons skilled in the art of such devices may upon disclosure to the teachings herein, conceive other variations. Such variations are deemed to be encompassed by the disclosure, the invention being delimited only by the following claims.

Having thus described my invention, I claim:

1. A fluidized bed apparatus wherein the improvement comprises:

a piping system including at least a first tubular member, at least a second tubular member, and apparatus for holding said first tubular member with respect to said second tubular member which includes a body, said body having a first cylindrical section shaped portion and a second cylindrical section shaped portion, each of said cylindrical section shaped portions having an angular extent that is generally concave, the angular extent of said first cylindrical section shaped portion and the angular extent of said second cylindrical section shaped portion each have an axis, the axis of the first cylindrical section shaped portion being spaced from the axis of the second cylindrical section shaped portion, said first cylindrical section shaped portion engaging said first tubular member and said second cylindrical section shaped portion engaging said second tubular, said first cylindrical sections shaped portion being welded to said first tubular member and said second cylindrical section shaped portion being welded to said second tubular member each of said cylindrical section shaped portions has extremities and the system further includes a weld bead extending between each of said extremities of said first cylindrical section shaped portion and said first tubular member and a weld bead extending between each of said extremities of said second cylindrical section shaped portion and said second tubular member.

2. A fluidized bed apparatus as described an claim 1 wherein:

said axis of said first cylindrical section shaped portion is perpendicular to said axis of said second cylindrical section shaped portion.

3. A fluidized bed apparatus as described in claim 2 further including:

a plurality of additional tubular members, each of said additional tubular members being parallel to said first tubular member and each being affixed to a said second tubular member by a body identical to said body joining said first and second tubular members.

4. A fluidized bed apparatus as described in claim 3 further including:

a third tubular member disposed in parallel relationship to a said second tubular member, said third tubular member being affixed to each of said plurality of additional tubular members by a body identical to said body joining said first and second tubular members.

5. A fluidized bed apparatus as described in the claim 4 wherein:

each of said bodies that is affixed to a tubular member is secured thereto by a weld.

6. A fluidized bed apparatus as described in claim 5 wherein:

each of said welds joining one body to a tubular member extends along the extremities of the cylindrical section shaped portions of said body.

* * * * *